United States Patent [19]
Dennis

[11] Patent Number: 4,819,516
[45] Date of Patent: Apr. 11, 1989

[54] METHOD OF FORMING A CUTTING ELEMENT HAVING A V-SHAPED DIAMOND CUTTING FACE

[75] Inventor: Mahlon D. Dennis, Kingwood, Tex.

[73] Assignee: Diamant Boart-Stratabit (USA) Inc., Houston, Tex.

[21] Appl. No.: 141,533

[22] Filed: Jan. 7, 1988

[51] Int. Cl.⁴ ............................................. B21K 5/02
[52] U.S. Cl. ............................... 76/101 R; 76/108 A
[58] Field of Search ............. 76/101 R, 108 A, 108 R, 76/DIG. 11, DIG. 12

[56] References Cited

U.S. PATENT DOCUMENTS

Re. 32,036 11/1985 Dennis .
1,544,757 7/1925 Hufford et al. .
3,027,952 4/1962 Brooks ............................. 76/108 R
4,333,540 6/1982 Daniels et al. .

FOREIGN PATENT DOCUMENTS 499974 7/1936 United Kingdom .

Primary Examiner—Roscoe V. Parker
Attorney, Agent, or Firm—Burns, Doane, Swecker & Mathis

[57] ABSTRACT

A cutting element has a V-shaped diamond cutting face. The cutting element is formed from a single circular cutting blank by cutting the blank into segments, joining two identical ones of the segments, and truncating the joined segments.

12 Claims, 2 Drawing Sheets

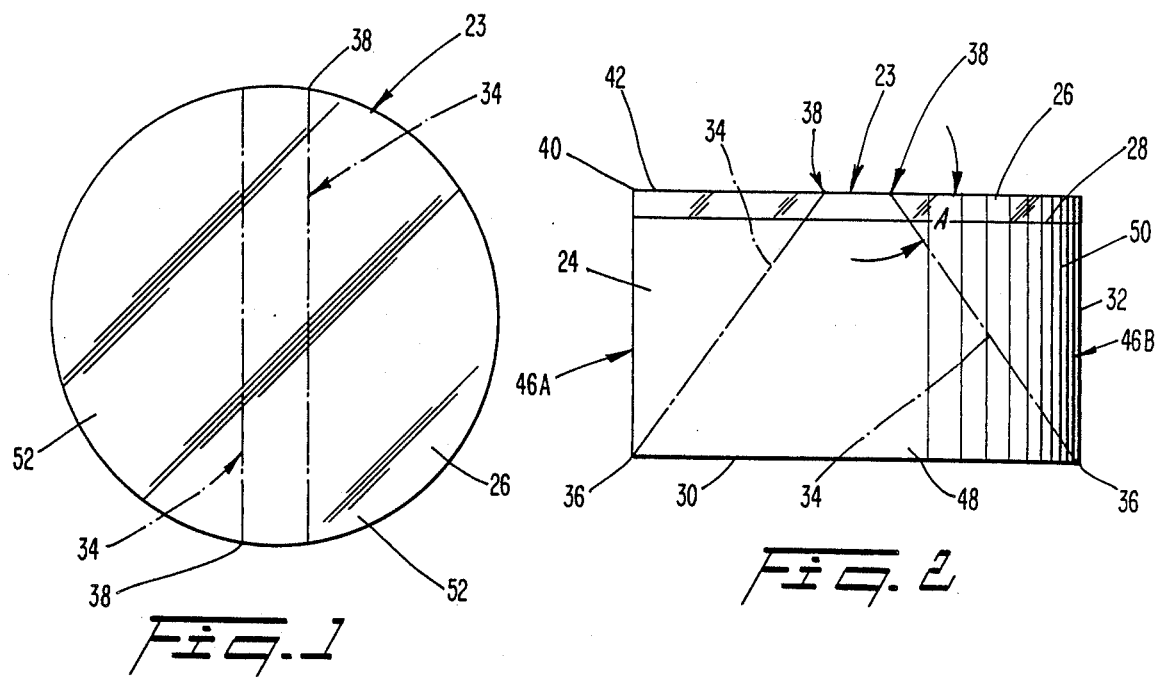
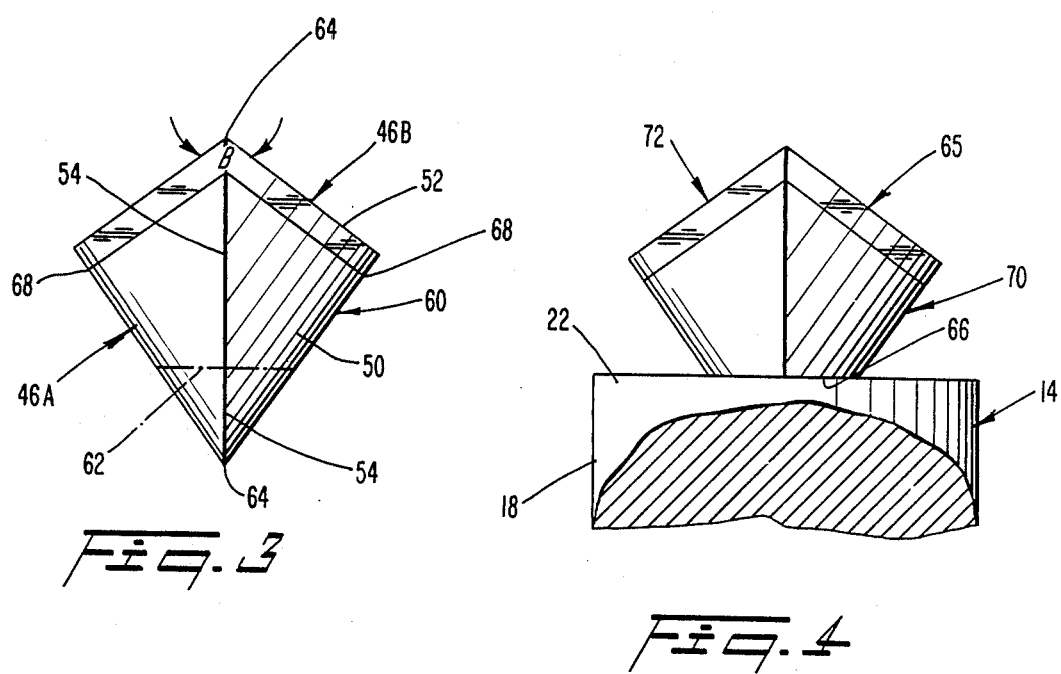

METHOD OF FORMING A CUTTING ELEMENT HAVING A V-SHAPED DIAMOND CUTTING FACE

BACKGROUND OF THE INVENTION

The present invention relates to drill bits for drilling in subterranean formations and, in particular to a method of making a diamond faced cutting element having a plow-shaped cutting surface.

Cutting elements having plow-shaped cutting surfaces are well known, as disclosed for example in U.S. Pat. Nos. 1,544,757 and 4,333,540, and in British Patent No. 449,974. Such cutting surfaces, which may have a diamond substance bonded thereto, perform a plowing action to promote the discharge of cuttings away from the cutting element. That cutting action is especially beneficial in relatively soft formations.

Techniques for bonding a diamond substance onto a flat surface of a substrate are well known. However, the bonding of diamond to mutually angled surfaces would involve considerable difficulties. In the afore-mentioned U.S. Pat. No. 4,333,540, it is proposed to bond the diamond to the V-shaped surface of a substrate. An alternative proposal disclosed in that patent involves the bonding together of two flat diamond composite drill blanks at a suitable angle. The former technique would be very difficult, while the latter technique, to the extent that it can be understood, would be expensive in that it requires the use of two commercially available flat diamond blanks to make a single cutting element.

SUMMARY OF THE INVENTION

The present invention involves a method of forming a cutting element. The method includes the step of providing a blank which includes a substrate and a diamond layer. The substrate has a front surface, a rear surface, and a side surface interconnecting the front and rear surfaces. The diamond layer is disposed on the front surface and includes an exposed cutting surface. Two similar segments are cut from the blank along first and second cut lines. Each cut line extends from adjacent an outer peripheral edge of the inner surface to a location on the exposed cutting surface disposed adjacent a longitudinal center point thereof. The cut lines form equal acute angles with the exposed cutting surface. Each segment is three-sided and includes a curved side, a flat front side, and a flat base side. The curved side is defined partially by the side surface of the substrate and partially by the diamond layer. The flat front side is formed by a segment of the exposed cutting surface. The flat base side is formed by cut-off surfaces of the substrate and diamond layer. The base sides are joined together wherein the cutting surfaces are contiguous and formed therebetween an included angle less than 180°. The segments are truncated along a third cut line extending through the curved sides and transversely of the base sides to form a mounting surface defined partially by each segment.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 1 is a front view of a diamond cutting blank depicting, in phantom, cut lines which are to be made in accordance with the present invention;

FIG. 2 is a side elevational view of the cutting blank depicted in FIG 1;

FIG. 3 is a side elevational view of a component which is formed by joining together identically shaped segments of the cut blank;

FIG. 4 is a side elevational view of a cutting member formed by truncating the component depicted in FIG. 3, the cutting member being mounted to a stud;

DETAILED DESCRIPTION OF A PREFERRED EMBODIMENT OF THE INVENTION

Figure 5:
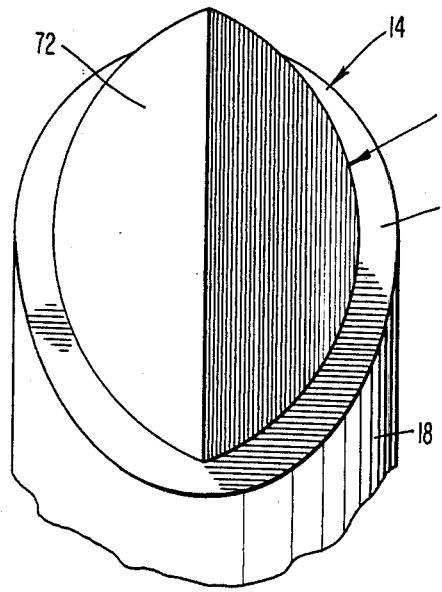
FIG. 5 is a front elevational view of the cutting element defined by the cutting member and the stud.
Figure 6:
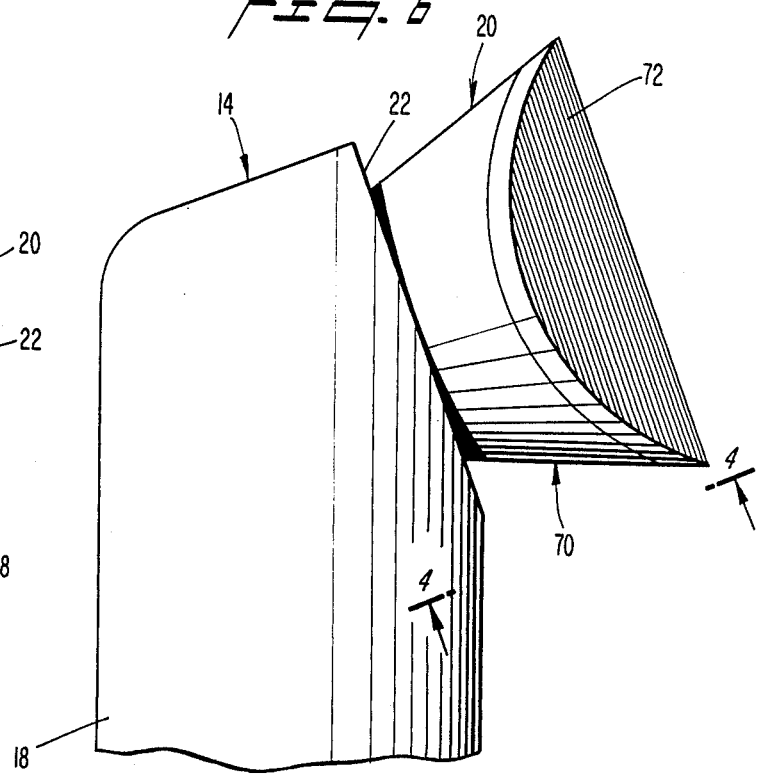
FIG. 6 is a side elevational view of the cutting element.
Figure 7:
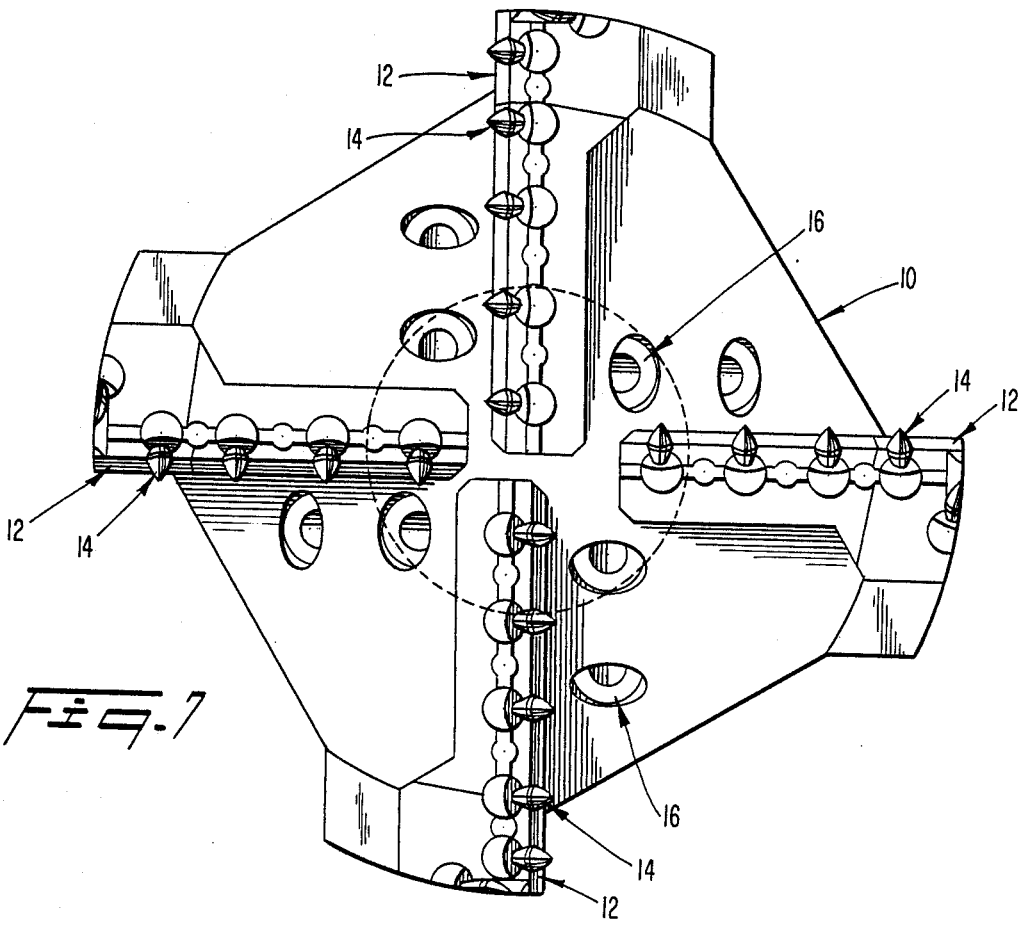
FIG. 7 is a front end view of a drag bit containing cutting elements according to the present invention.

Depicted in FIG. 7 is a drag-type rotary drill bit comprising a plurality of radial arms 12 disposed on a front face thereof. Mounted in each arm 12 is a plurality of cutting elements 14 constructed according to the present invention. Nozzles 16 are provided in the front face for emitting drilling fluid which cools and cleans the cutting elements and flushes cuttings to the top of the bore hole.

Each cutting element 14 according to the present invention comprises a stud 18 and a plow-shaped cutting member 20 mounted on a face 22 thereof. The stud is preferably formed of carbide such as cemented tungsten carbide and is configured for insertion into a bore formed in the arm 12.

In accordance with the present invention, the cutting member 20 is formed from a single conventional diamond cutting disc or blank such as of the type disclosed for example in U.S. Pat. No. Re. 32,036. An example of such blank 23 is depicted in FIGS. 1 and 2, and comprises a circular cylindrical substrate 24 and a circular diamond layer 26 adhered to a front surface 28 thereof. The substrate 24 is preferably formed of the same material as the stud and includes a rear surface 30 which is normally mounted to the stud 18. A side surface 32 of the substrate joins the front and rear surfaces.

In forming the cutting member 20 according to the present invention, the blank 23 is cut along two similar cut lines 34, each extending from an outer peripheral edge 36 of the rear surface 30 to a location 38 spaced radially inwardly of the outer peripheral edge 40 of the exposed cutting surface 42 of the diamond layer 26, but no farther radially inwardly than the center of the exposed diamond surface. Preferably, the location 38 is spaced slightly from the center. The two cuts 34 form the same angle A relative to the exposed cutting surface. That angle is preferably greater than 45°, e.g., 54°.

As a result of those two cuts 34, the blank is divided into three pieces, viz., a pair of similar-shaped segments 46A, 46B and a third portion 48.

Each of the segments 46A, 46B comprises (1) a curved generally conically shaped side 50 defined partially by a fragment of the side surface of the substrate and a fragment of the diamond layer 28, (2) a flat diamond side 52 in the shape of a circular segment, and (3) a flat generally triangular base side 54 formed partially by the substrate 24 and partially by the diamond layer 26.

The two segments 46A, 46B are then suitably bonded together by joining the base sides 54, e.g., by brazing or sintering, as depicted in FIG. 3. The base sides are joined such that the diamond sides 52 are contiguous and form therebetween an included angle B preferably greater than 90°, and most preferably greater than 100°, e.g., 108°. That is, the angle B equals two times the angle A.

The component 60 (FIG. 3) comprised of the two joined segments 46A, 46B is then truncated along a cut line 62 extending through the curved sides 50 and intersecting the base sides 54 at right angles at a location intermediate the ends 64 of the base sides.

As a result, the component 60 is transformed into a cutting member 65 (FIG. 4) having a mounting surface 66 defined partially by each segment 46A, 46B and extending perpendicularly to the base sides 54. That mounting surface 66 is then joined to the surface 22 of the stud to form the cutting element 14.

The cut line 62 is disposed rearwardly of rearwardmost portions 68 of the diamond layer so that the component is five-sided as viewed in a direction parallel to a line of intersection of the mounting surface 66 and the base side 54, i.e., as viewed in FIG. 3. Thus, the substrate 70 of the cutting member 65 defines an extension which spaces the diamond cutting face 72 from the support stud 18.

Preferably, the segments 46A, 46B are joined prior to being truncated at 62. Alternatively, the segments could be truncated separately and then joined together.

As a result of the invention, a cutting element having a V-shaped cutting face can be conveniently manufactured in a relatively practical and economical manner.

Furthermore, the remaining portion 48 of the blank can be mounted to a support member and used as a chisel-like diamond cutting element.

Although the present invention has been described in connection with a preferred embodiment thereof, it will be appreciated by those skilled in the art that modifications, substitutions, additions and deletions not specifically described may be made without departing from the spirit and scope of the invention as defined in the appended claims.

What is claim is:

1. A method of forming a cutting member comprising the steps of:
   (A) providing a blank including:
      (A1) a substrate having a front surface, a rear surface, and a side surface interconnecting said front and rear surfaces, and
      (A2) a diamond layer disposed on said front surface, said diamond layer including an exposed cutting surface,
   (B) cutting two similar segments from said blank along first and second cut lines, each cut line extending from adjacent an outer peripheral edge of said rear surface to a location on said exposed cutting surface disposed adjacent a longitudinal center point thereof, said cut lines forming equal acute angles with said exposed cutting surface, each said segment being three-sided and including:
      (B1) a curved side defined partially by said side surface of said substrate and partially by said diamond layer,
      (B2) a flat front side formed by a segment of said exposed cutting surface, and
      (B3) a flat base side formed by cut-off surfaces of said substrate and diamond layer,
   (C) joining said base sides together wherein said cutting surfaces are contiguous and form therebetween an included angle less than 180 degrees, and
   (D) truncating said segments along a third cut line extending through said curved sides and transversely of said base sides to form a mounting surface defined partially by each said segment.

2. A method according to claim 1, wherein said third cut line of each segment is spaced rearwardly of rearwardmost portions of said diamond layer whereby said segments when joined form a component which is five-sided as viewed in a direction parallel to the line of intersection of said side surface and said third cut line.

3. A method according to claim 1, wherein said providing step comprises providing a circular blank.

4. A method according to claim 1, wherein said included angle is greater than 90 degrees.

5. A method according to claim 1, wherein said included angle is greater than 100 degrees.

6. A method according to claim 1, wherein said first and second cut lines are non-intersecting and extend to locations spaced outwardly from said center point.

7. A method according to claim 1, wherein said joining step is performed prior to said truncating step.

8. A method according to claim 1, wherein said third cut line extends perpendicularly to said base sides.

9. A method according to claim 1, wherein said substrate is formed of cemented carbide.

10. A method according to claim 1, wherein said support member comprises cemented carbide.

11. A method of forming a cutting element comprising the steps of:
    (A) providing a circular blank including:
       (A1) a substrate having a front circular surface, a rear circular surface, and a side cylindrical surface interconnecting said front and rear surfaces, and
       (A2) a circular diamond layer disposed on said front surface, said diamond layer including an exposed circular cutting surface,
    (B) cutting two similar segments from said blank along first and second cut lines, each cut line extending from adjacent an outer peripheral edge of said rear surface to a location on said exposed cutting surface disposed adjacent a longitudinal center point thereof, said cut lines forming equal acute angles with said exposed cutting surface, each said segment being three-sided and including:
       (B1) a curved side defined partially by said side surface of said substrate and partially by said diamond layer,
       (B2) a flat front side formed by a segment of said exposed cutting surface, and
       (B3) a flat base side formed by cut-off surfaces of said substrate and diamond layer,
    (C) joining said base sides together wherein said cutting surfaces are contiguous and form therebetween an included angle greater than 90°,
    (D) truncating said joined segments along a third cut line extending through said curved sides and perpendicularly of said base sides at a location rearwardly of rearwardmost portions of said diamond layer to form a mounting surface defined partially by each said segment, and
    (E) bonding said mounting surface to a support member.

12. A method according to claim 11, wherein a portion of said blank remaining after removal of said two segments therefrom is mounted to a support member for use as a cutting element.

* * * * *